United States Patent
Bouzegzi et al.

(10) Patent No.: US 8,553,789 B2
(45) Date of Patent: Oct. 8, 2013

(54) METHOD FOR THE ESTIMATION OF OFDM PARAMETERS BY ADAPTATION OF COVARIANCE

(75) Inventors: Abdelaziz Bouzegzi, Lyons (FR); Pierre Jallon, Grenoble (FR); Philippe Ciblat, Paris (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 195 days.

(21) Appl. No.: 12/966,578

(22) Filed: Dec. 13, 2010

(65) Prior Publication Data
US 2011/0228830 A1 Sep. 22, 2011

(30) Foreign Application Priority Data
Dec. 14, 2009 (FR) .................................. 09 58910

(51) Int. Cl.
H04K 1/10 (2006.01)
(52) U.S. Cl.
USPC .......................................... 375/260; 375/295
(58) Field of Classification Search
USPC .......................................... 375/260, 295, 299
See application file for complete search history.

(56) References Cited

U.S. PATENT DOCUMENTS

| | | | |
|---|---|---|---|
| 8,204,581 B2 * | 6/2012 | Kamousi et al. | 600/518 |
| 2003/0236633 A1 * | 12/2003 | Mei et al. | 702/20 |
| 2005/0255467 A1 * | 11/2005 | Adorjan et al. | 435/6 |
| 2010/0002786 A1 * | 1/2010 | Kuo et al. | 375/260 |

OTHER PUBLICATIONS

European Search Report issued Feb. 3, 2011, in EP 10 19 3758.

Jaume Riba, et al., "Parameter Estimation of Binary CPM Signals", IEEE, XP 10803251, May 2001, pp. 2561-2564.
Javier Villares, et al., "Sample Covariance Matrix Based Parameter Estimation for Digital Synchronization", IEEE, vol. 1, XP 10635994, Nov. 2002, pp. 463-467.
Abdelaziz Bouzegzi, et al., "New algorithms for blind recognition of OFDM based systems", Signal Processing, vol. 90, No. 3, XP 26748118, Mar. 2010, pp. 900-913.
Joseph Mitola, "Cognitive Radio: An Integrated Agent Architecture for Software Defined Radio", Royal Institute of Technology, May 8, 2000, 313 pages.
Peng Liu, et al., "A Blind Time-parameters Estimation Scheme for OFDM in Multi-path Channel", IEEE, Int'l Conference on Information, Communications and Signals Processing, vol. 1, Sep. 23-26, 2005, pp. 222-227.
Abdelaziz Bouzegzi, et al., "Maximum Likelihood based methods for OFDM intercarrier spacing characterization", IEEE International Symposium on Personal Indoor and Mobile Radio Communications (PIRMC), 2008, 5 pages.
Abdelaziz Bouzegzi, et al., "Matched filter based algorithm for blind recognition of OFDM systems", IEEE Vehicular Technology Conference, Sep. 2008, pp. 1331-1335.
Abdelaziz Bouzegzi, et al., "A Fourth-Order Algorithm for Blind Characterization of OFDM Signals", IEEE Workshop on Signal Processing and Advances in Wireless Communication (SPAWC), Jul. 2008, pp. 411-415.

* cited by examiner

*Primary Examiner* — Emmanuel Bayard
(74) *Attorney, Agent, or Firm* — Oblon, Spivak, McClelland, Maier & Neustadt, L.L.P.

(57) ABSTRACT

A method of estimating at least one modulation parameter of an OFDM signal, the signal being sampled during a time window in order to provide a sequence of samples, the method including: (a) grouping together consecutive samples of the sequence according to a tested value of the parameter, in order to form a plurality of vectors; (b) estimating a covariance matrix of the vectors; (c) calculating a theoretical covariance matrix that would be obtained using an OFDM signal of which the modulation parameter would have the tested value; (d) measuring a distance between the covariance matrix and the theoretical covariance matrix; and iterating the steps (a), (b), (c) and (d), wherein the estimated value of the parameter is that achieving a shortest distance in the step (d).

12 Claims, 12 Drawing Sheets

METHOD FOR THE ESTIMATION OF OFDM PARAMETERS BY ADAPTATION OF COVARIANCE

TECHNICAL FIELD

This invention relates to a method for estimating OFDM (Orthogonal Frequency Division Multiplex) modulation parameters. It can be applied particularly in opportunistic telecommunication systems (Cognitive Radio).

PRIOR ART

OFDM modulation is well known in prior art and is used in many telecommunication systems such as DVB-T, ADSL, Wi-Fi (IEEE 802 a/g), WiMax (IEEE 802.16). It has the advantage of good spectral efficiency and good protection against frequency-selective fading.

Recall that in an OFDM system, the information symbols to be transmitted are grouped by blocks of N symbols, where N is generally a power of 2, the OFDM symbols being obtained by carrying out an IFFT (Inverse Fast Fourier Transform) on said blocks of information symbols. Generally, a cyclic prefix is added at the beginning of each OFDM symbol in order to absorb the intersymbol interference or ISI and facilitate equalization at reception. The OFDM signal comprised of these OFDM symbols can be then frequency up-converted.

Generally, the signal transmitted by an OFDM system can be represented in base band by:

$$s_a(t) = \frac{\sqrt{E}}{N} \sum_k \sum_{n=0}^{N-1} a_{k,n} e^{-2i\pi \frac{n}{NT_c}(t-DT_c-kT_s)} g_a(t-kT_s) \quad (1)$$

where E is the power of the signal, N is the number of carriers of the OFDM multiplex, $a_{k,n}$ are the information symbols relative to the block k, belonging to a M-order modulation alphabet, typically BPSK, QPSK or QAM, $1/T_c$ is the flow of the information symbols where $T_c$ is the "chip" time, $T_s$ is the total duration of the OFDM symbol with $T_s=(N+D)T_c$, where D is the size of the cyclic prefix expressed as a number of chips, $g_a(t)$ is the impulse response of the shaping filter of the OFDM symbols, of time support $[0,T_s]$, intended to apodise the spectrum of the signal.

An OFDM signal has been shown diagrammatically in FIG. 1. It is comprised of a sequence of OFDM symbols, each symbol having a total duration $(N+D)T_c$ of which a useful duration $NT_c$ and a duration guard interval $T_{prefix}=DT_c$, containing the cyclic prefix. Recall that, conventionally, the cyclic prefix is a copy of the end of the OFDM symbol into the guard interval. In certain OFDM systems, the cyclic prefixes are simply omitted, in other words the useful portions of the symbols are separated by "empty" guard intervals. This transmission technique also makes it possible to remove the intersymbol interference but makes the equalization of the signal more complex.

After propagation in the transmission channel, the OFDM signal received by the receiver can be expressed by:

$$y_a(t)=h \otimes s_a(t)+b(t) \quad (2)$$

where $h \otimes s_a$ is the convolution between the OFDM signal transmitted, $s_a(t)$ is the impulse response of the transmission channel h(t), and b(t) is a random function describing the noise. We shall suppose that the length of the impulse response of the canal is less than the duration of the guard interval, in such a way that the intersymbol interference (ISI) can be left aside.

FIG. 2 diagrammatically shows the structure of an OFDM receiver.

After possible base-band demodulation, the signal received is sampled in 210 at the chip frequency, then the samples are subjected to a serial/parallel conversion in 220 in order to form blocks of N+D samples. The first D samples corresponding to the guard interval are rejected and the block of the N remaining samples corresponding to the useful portion of the OFDM symbol is subjected to a FFT in 230. The demodulated symbols obtained are then subjected to a serial conversion in 240.

Finally, supposing that the receiver is well synchronised in time and in frequency, the demodulated symbols can be expressed by:

$$z_{k,n}=h_n a_{k,n}+b_{k,n} \quad (3)$$

where $h_n$ is a complex coefficient which depends on the impulse response of the transmission channel, and $b_{k,n}$ is a random variable representing a sample of noise.

The proper operation of this receiver requires a precise synchronisation in time and in frequency. Indeed, it is understood that a poor synchronisation in time will result in a progressive time sliding of the truncation window and a poor synchronisation in frequency, a phase rotation of the samples, which can be represented by a multiplication factor $e^{2i\pi \Delta f n T_c}$ where $\Delta f$ if the frequency offset between the demodulation frequency of the receiver and the carrier frequency of the OFDM multiplex.

The time and frequency synchronization of the receiver is generally carried out thanks to the acquisition of a training sequence.

The proper operation of the receiver also supposes that the modulation parameters of the OFDM signal are known. Modulation parameters, or more simply OFDM parameters, here means the useful duration $NT_c$, the duration of the guard interval $DT_c$ and/or the repetition period $(N+D)T_c$ of these symbols, or the inverse of these values. Note that with regards to this, $1/NT_c$ shows the spacing between sub-carriers and $1/(N+D)T_c$ the symbol frequency.

Very often the receiver does not a priori know the OFDM modulation parameters and must therefore estimate them blindly before being able to demodulate the signal.

Moreover, opportunistic radio systems are known of which a description can be found in the founding thesis of J. Mitola entitled "Cognitive radio: an integrated agent architecture for software defined radio<<, Royal Institute of Technology, Stockholm, PhD Dissertation, 8 May 2000. When a primary user of such a system uses an OFDM modulation (WiFi, Wi-Max, LTE, WRAN, 802.22, DVB-T etc.), a secondary user, still referred to as opportunistic, must be in a position to detect whether or not an OFDM signal is present in a given band, and consequently to estimate an OFDM parameter of such a signal.

Different methods have been proposed to blindly estimate the OFDM parameters of a signal. Most of these methods make use the presence of the cyclic prefix in the OFDM signal and the cyclostationarity properties that stem from it. The proposed estimators are based on the autocorrelation function of the OFDM signal. An example in particular can be found of such a method of estimation in the article of P. Liu et al. entitled "A blind time-parameters estimation scheme for OFDM in multi-path channel", published in Proc. 2005 Int'l Conference on Information, Communications and Signal Processing, vol. 1, pp. 242-247, 23-26 Sep. 2005.

These methods for estimation however require the acquisition of a high number of OFDM symbols in order to perform the calculation of the autocorrelation function. Furthermore, these methods cannot operate or operate poorly when the OFDM signal is devoid of a cyclic prefix.

Several methods have already been considered with success to blindly estimate OFDM parameters in the absence of a cyclic prefix. They are respectively based on a maximum likelihood criterion, matched filtering and a minimisation of the entropy at the output of an adaptive OFDM receiver. A description of these methods can be found in the articles of A. Bouzegzi et al., respectively entitled "Maximum Likelihood based methods for OFDM intercarrier characterization", IEEE International Symposium on Personal Indoor and Mobile Radio Communications (PIRMC), 2008; "Matched filter based algorithm for blind recognition of OFDM systems", IEEE Vehicular Technology Conference, September 2008; and "A fourth-order based algorithm for characterization of OFDM signals", IEEE Workshop on Signal Processing and Advances in Wireless Communication (SPAWC), July 2008.

However, with a low signal-to-noise ratio the aforementioned methods are inoperative and result in errors in estimating OFDM parameters. Furthermore, they require that the signal-to-noise ratio be known, which can be delicate, in particular in an opportunistic context.

None of the aforementioned methods makes it possible to jointly determine the OFDM parameters and the signal-to-noise ratio. But, such a method of estimating would allow a receiver to rapidly determine the status of the OFDM channel and to return to the transmitter information referred to as CSI (Channel State Information) describing it. The CSI information is advantageously used by the transmitter in order to perform a frequency sequencing, a link adaptation, etc.

The purpose of this invention is consequently to propose a method for estimating modulation parameters of an OFDM signal, with a high success rate, even with a low signal-to-noise ratio and this, whether or not the signal is devoid of a prefix.

A subsidiary purpose of this invention is to allow a receiver to carry out a joint estimation of the OFDM parameters and of the signal-to-noise ratio.

DESCRIPTION OF THE INVENTION

This invention is defined by a method of estimating at least one modulation parameter of an OFDM signal, said signal being sampled during a time window in order to provide a sequence of samples, wherein:

(a) consecutive samples of said sequence are grouped together, according to a tested value of said parameter, in order to form a plurality of vectors;

(b) the covariance matrix of the vectors obtained as such is estimated;

(c) the theoretical covariance matrix that would be obtained using an OFDM signal of which said modulation parameter would have said tested value is calculated;

(d) a distance is measured between the covariance matrix and the theoretical covariance matrix;

and in that the steps (a), (b), (c) and (d) are iterated, the estimated value of the parameter being that achieving the shortest distance in the step (d).

According to an alternative embodiment, the theoretical covariance matrix is obtained according to said tested value of the modulation parameter, of a tested value of the power of the signal and of a tested value of the noise power, the steps (c) and (d) then being iterated for a plurality of tested values of signal and noise power.

Advantageously, the method of estimating can also provide an estimation of the signal-to-noise ratio using values of signal and noise power minimising said distance together with the estimated value of the modulation parameter.

The theoretical covariance matrix can be calculated by means of:

$$R_{yy}(\tilde{\theta},\tilde{\sigma}_a,\tilde{\sigma}_b) = \tilde{\sigma}_a^2 FF^H + \tilde{\sigma}_b^2 I$$

where $\tilde{\theta}$, $\tilde{\sigma}_a^2$, $\tilde{\sigma}_b^2$ are respectively the tested values of the modulation parameter, of the signal power and of the noise power; I is the unit matrix of size $\tilde{N} \times \tilde{N}$ where $\tilde{N}$ is the number of sub-carriers of the OFDM multiplex, known or supposed, and the matrix F is a matrix of size $\tilde{P} \times \tilde{N}$ with $\tilde{P} = \lfloor (\tilde{N}\tilde{T}_c + \tilde{D}\tilde{T}_c)/\tilde{T}_e \rfloor$, of which the elements are given by:

$$F_{m,n}^{\tilde{\theta}} = \frac{1}{\sqrt{\tilde{N}}} e^{-2i\pi nm \cdot \frac{T_e}{\tilde{N}\tilde{T}_c}} e^{-2i\pi n \frac{\tilde{D}\tilde{T}_c}{\tilde{N}\tilde{T}_c}}$$

where $\tilde{N}\tilde{T}_c$ is the useful duration of the OFDM symbols, known or tested, $\tilde{D}\tilde{T}_c$ is the duration of the prefix of the OFDM symbols, known or tested, and $T_e$ is the sampling period of the OFDM signal.

The covariance matrix can be estimated by:

$$\hat{R}_{yy}(\tilde{\theta}) = \frac{1}{\tilde{K}} \sum_{k=0}^{\tilde{K}-1} y_k y_k^H$$

where $y_k = (y_{k,0}, \ldots y_{k,\tilde{P}-1})^T$ is the k th vector of said plurality of vectors, $y_{k,p} = y_a(pT_e + \tilde{D}\tilde{T}_c + k(\tilde{N}\tilde{T}_c + \tilde{D}\tilde{T}_c))$ where $\tilde{N}\tilde{T}_c$ is the useful duration of the OFDM symbols, known or tested, $\tilde{D}\tilde{T}_c$ is the duration of the prefix of the OFDM symbols, known or tested, $T_e$ is the sampling period of the OFDM signal and $$\tilde{K} = \left\lfloor \frac{M}{\tilde{P}} \right\rfloor$$

with $\tilde{P} = \lfloor (\tilde{N}\tilde{T}_c + \tilde{D}\tilde{T}_c)/\tilde{T}_e \rfloor$ and M is the total number of samples in the time window.

The distance between the covariance matrix and the theoretical covariance matrix can be calculated by means of:

$$J_{COMET}(\tilde{\theta},\tilde{\sigma}_a,\tilde{\sigma}_b) = \|\hat{R}_{yy}(\tilde{\theta}) - R_{yy}(\tilde{\theta},\tilde{\sigma}_a,\tilde{\sigma}_b)\|_F^2$$

where $\|.\|_F$ is the Frobenius norm.

Alternatively, the distance between the covariance matrix and the theoretical covariance matrix can be calculated by means of:

$$J_{MCOMET}(\tilde{\theta},\tilde{\sigma}_a,\tilde{\sigma}_b) = \frac{\tilde{K}}{\tilde{P}^2} \|\hat{R}_{yy}(\tilde{\theta}) - R_{yy}(\tilde{\theta},\tilde{\sigma}_a,\tilde{\sigma}_b)\|_F^2$$

where $\|.\|_F$ is the Frobenius norm.

The modulation parameter can be the total duration of an OFDM symbol, the useful duration of an OFDM symbol, the duration of the prefix of an OFDM symbol, the number of sub-carriers of an OFDM symbol.

Said method of estimating can also be applied to a set of modulation parameters comprised of the useful duration of an OFDM symbol, of the prefix duration of an OFDM symbol and of the number of sub-carriers of the OFDM multiplex, the estimated values of these parameters then being the tested values jointly minimising said distance.

BRIEF DESCRIPTION OF THE DRAWINGS

Other characteristics and advantages of the invention shall appear when reading a preferred embodiment of the invention provided in reference to the annexed figures wherein.

DETAILED DESCRIPTION OF PARTICULAR EMBODIMENTS

Figure 1:
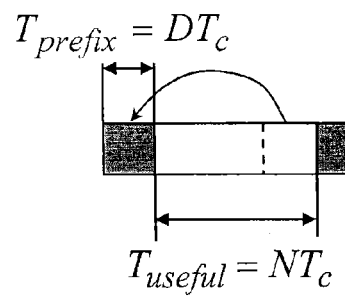
FIG. 1 diagrammatically shows an OFDM signal.
Figure 2:
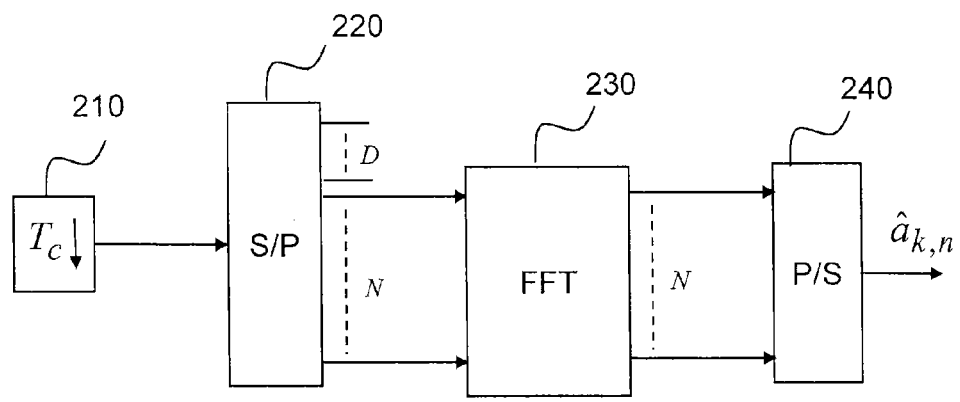
FIG. 2 diagrammatically shows an OFDM receiver of prior art.

We shall consider in what follows the case of a telecommunication system using an OFDM modulation. We shall suppose that the OFDM signal transmitted has the form given by the expression (1) and that the information symbols can be represented by independent random variables, identically distributed and taking their values in an M-order modulation alphabet.

After base-band demodulation, the signal received is sampled at a frequency $$f_e = \frac{1}{T_e},$$

higher than the width of the OFDM band under consideration in order to satisfy the Nyquist criterion. As such, it is certain that the sampling period $T_e$ is less than the chip period $T_c$. Let $T_0$ be the duration of the observation window, the discrete-time signal obtained is composed of $$M_0 = \left\lfloor \frac{T_0}{T_e} \right\rfloor$$

samples (where $\lfloor x \rfloor$ designates the largest integer less than x).

If the receiver knows the parameters $NT_c$, $DT_c$ and N of the OFDM signal, the samples can be grouped together by OFDM symbols of size $P = \lfloor (NT_c + DT_c)/T_e \rfloor$ and the expression (2) can then be rewritten in vector form:

$$y_k = Ga_k + b \qquad (4)$$

where $a_k$ is the k-th vector of size N of the symbols transmitted, b is a vector of size P, representing the noise, supposedly additive and Gaussian and $y_k$ is a vector of size P comprised of P consecutive samples $y_{k,p} = y_a(pT_e + DT_c + k(NT_c + DT_c))$, $p = 0, \ldots, P-1$. The P samples of noise are random variables, independent amongst themselves, and of the useful signal; G=HF where H is the matrix of size N×N representative of the frequency response of the canal and F is a matrix of size P×N of which the elements are given by:

$$F_{m,n} = \frac{1}{\sqrt{N}} e^{-2i\pi nm \frac{T_c}{NT_c}} e^{-2i\pi n \frac{DT_c}{NT_c}} \qquad (5)$$

With a concern for simplification, but without loss of generality, we shall suppose that in what follows the transmission channel is without fading, in other words the matrix H is equal to the identity matrix to within about a multiplicative coefficient. The relation (4) can then be written in the form:

$$y_k = Fa_k + b \qquad (6)$$

We shall now consider the case where the receiver operates blindly. The parameters $NT_c$, $DT_c$ and N, characterising the OFDM signal are therefore unknowns that can be grouped together in the form of a parameter to be estimated $\tilde{\theta} = (\tilde{N}\tilde{T}_c, \tilde{D}\tilde{T}_c, \tilde{N})$. The samples of the OFDM signal received by the receiver are grouped together in the form of vectors of size $\tilde{P} = \lfloor (\tilde{N}\tilde{T}_c + \tilde{D}\tilde{T}_c)/\tilde{T}_e \rfloor$, noted $y_{\tilde{\theta}k}$, with:

$$y_{\tilde{\theta}k} = Fa_{\tilde{\theta}k} + b_{\tilde{\theta}k} \qquad (7)$$

where, in a manner similar to relation (6), $a_{\tilde{\theta}k}$ is the vector of size $\tilde{N}$ of the symbols transmitted, $b_{\tilde{\theta}k}$ is a vector of size $\tilde{P}$ representing the samples of additive Gaussian noise, and F the matrix of size $\tilde{P} \times \tilde{N}$ of which the elements are given by:

$$F_{m,n}^{\tilde{\theta}} = \frac{1}{\sqrt{\tilde{N}}} e^{-2i\pi nm \frac{T_e}{\tilde{N}\tilde{T}_c}} e^{-2i\pi n \frac{\tilde{D}\tilde{T}_c}{\tilde{N}\tilde{T}_c}} \qquad (8)$$

It is understood that $y_{\tilde{\theta}k}$ is a vector of $\tilde{P}$ random variables of which the covariance matrix equals:

$$R_{yy}(\tilde{\theta}, \sigma_n, \sigma_b) = E(yy^H) = \sigma_a^2 FF^H + \tilde{\sigma}_b^2 I \qquad (9)$$

where $\sigma_a^2$ and $\sigma_b^2$ show respectively the variance of the symbols transmitted and of the noise, and I is the unit matrix of size $\tilde{N} \times \tilde{N}$. With these conventions, the ratio $\sigma_a^2/\sigma_b^2$ is no other than the signal-to-noise ratio. The covariance matrix depends in general on the parameter $\tilde{\theta}$ and on the respective powers of the useful signal and of the noise.

The idea at the base of this invention is to estimate at least one modulation parameter of the OFDM signal by using a method for adapting the covariance.

Figure 3:
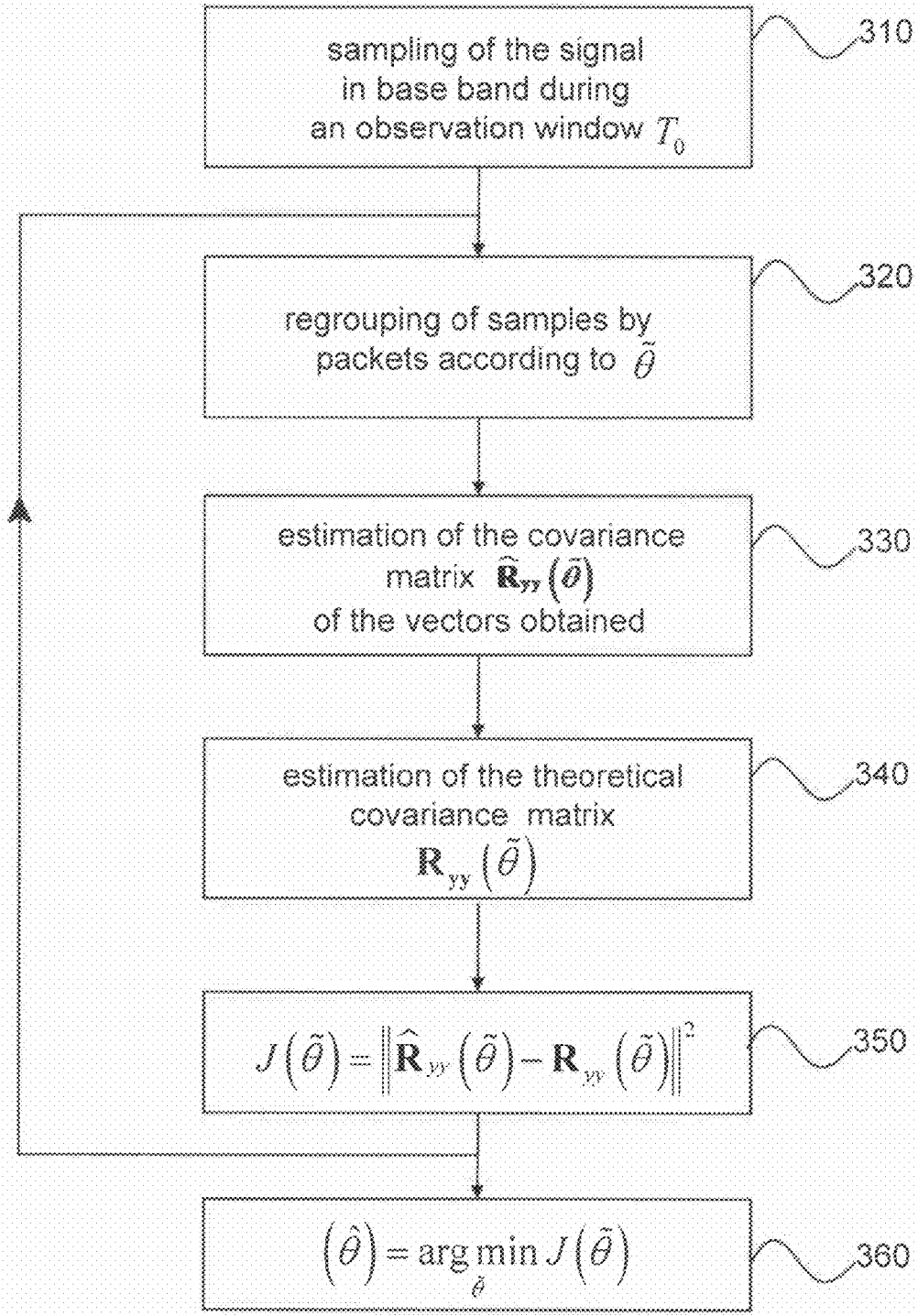
FIG. 3 shows a flow chart of the method of estimating an OFDM modulation parameter according to the invention.

FIG. 3 generally shows a flow chart of the method of estimating an OFDM modulation parameter according to the invention.

At the step 310, the OFDM signal is sampled in base-band during a time window of a given length. A sequence of samples is thus obtained.

At the step 320, samples of the sequence thus obtained are grouped into packets, according to a tested value, $\tilde{\theta}$, of the parameter to be estimated, each packet being formed by samples consecutive of said sequence and being represented by a vector noted $y_{\tilde{\theta}k}$.

At the step 330, the covariance matrix $\hat{R}_{yy}(\tilde{\theta})$ of the vectors thus obtained is estimated.

At the step 340, the theoretical covariance matrix $R_{yy}(\tilde{\theta})$ is then calculated which would be obtained using an OFDM signal of which said modulation parameter would have said tested value $\tilde{\theta}$.

At the step 350, a distance is calculated between the covariance matrix in 330 and the theoretical covariance matrix obtained in 340.

The steps 320 to 350 are repeated for a plurality of possible values of the parameter $\tilde{\theta}$. The estimated value, $\hat{\theta}$, of this parameter is obtained in 360 as that minimising the distance calculated in the step 350.

Those skilled in the art will understand that the value $\hat{\theta}$ which is obtained leads to the estimated covariance matrix the closest to the theoretical covariance matrix.

Figure 4:
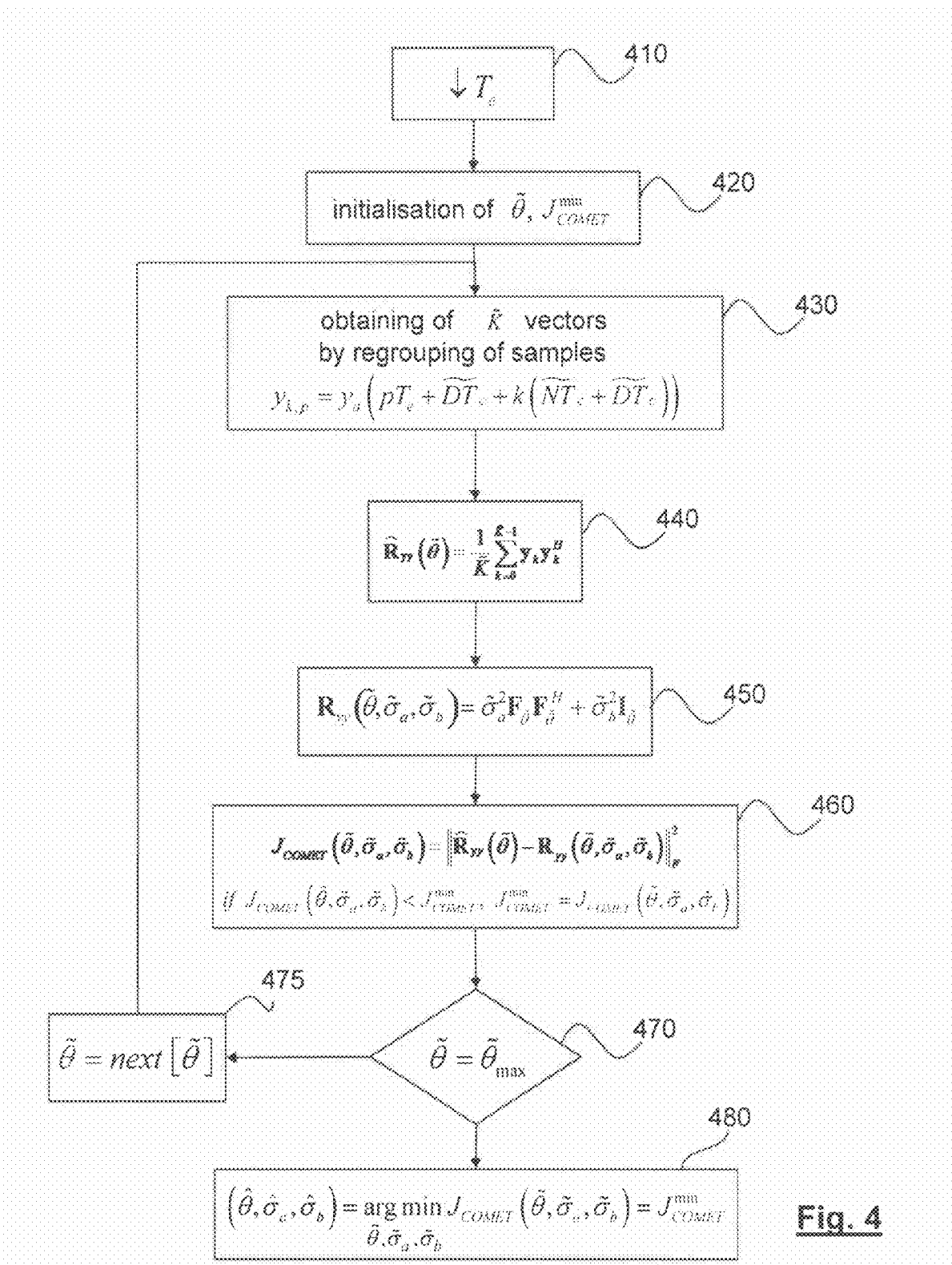
FIG. 4 shows a flow chart of the method of estimating OFDM modulation parameters according to a first embodiment of the invention.

FIG. 4 shows in a more detailed manner the method of estimating at least one OFDM modulation parameter according to a first embodiment of the invention.

At the step 410, the signal received is sampled in base-band, y, during a time window of width $T_0$. The sampling period $T_e$ is selected sufficiently short enough in order to comply with the Nyquist criterion, in light of the length of the OFDM band at hand. A sequence of $M_0$ samples is thus obtained.

At the step 420, a value to be tested of the parameter $\tilde{\theta}$ is chosen, i.e. values of useful duration $\tilde{N}\tilde{T}_c$, of prefix duration $\tilde{N}\tilde{T}_c$, and of the number of sub-carriers $\tilde{N}$. A power value of the signal transmitted $P_a = \tilde{\sigma}_a^2$ and a power value of the noise $P_b = \tilde{\sigma}_b^2$ are also chosen. This choice can be blind or semi-blind if the receiver knows one of the aforementioned values.

An arbitrarily large value $J_{COMET}^{min}$ is also chosen.

At the step 430, consecutive samples of the sequence are grouped together to form $\tilde{K}$ vectors $y_k$, k=0, ..., $\tilde{K}$-1, with $$\tilde{K} = \left\lfloor \frac{M}{\tilde{P}} \right\rfloor,$$

of size $\tilde{P} = \lfloor (\tilde{N}\tilde{T}_c + \tilde{D}\tilde{T}_c)/\tilde{T}_e \rfloor$. The $\tilde{P}$ components $y_{k,p}$, p=0, ..., $\tilde{P}$-1 of the vector $y_k$ are therefore obtained by:

$$y_{k,p} = y_a(pT_e + \tilde{D}\tilde{T}_c + k(\tilde{N}\tilde{T}_c + \tilde{D}\tilde{T}_c)) \tag{10}$$

The tested value of the modulation parameter, $\tilde{\theta}$, determines the size of these vectors as well as their starting points in the sequence.

At the step 440, the covariance matrix $R_{yy}(\tilde{\theta})$ is estimated by calculating:

$$\hat{R}_{yy}(\tilde{\theta}) = \frac{1}{\tilde{K}} \sum_{k=0}^{\tilde{K}-1} y_k y_k^H \tag{11}$$

with $y_k = (y_{k,0}, \ldots y_{k,\tilde{P}-1})^T$.

At the step 460, the distance is determined, in terms of the Frobenius norm, between the covariance matrix $\hat{R}_{yy}(\tilde{\theta})$ estimated using (11) and the theoretical matrix $R_{yy}(\tilde{\theta})$ obtained beforehand in 450 by:

$$R_{yy}(\tilde{\theta}, \tilde{\sigma}_a, \tilde{\sigma}_b) = \tilde{\sigma}_a^2 FF^H + \tilde{\sigma}_b^2 I \tag{12}$$

where $\tilde{\sigma}_a^2$ is a tested value of the power of the signal and $\tilde{\sigma}_b^2$ is a tested value of the power of noise.

Recall that the Frobenius norm of a matrix A is defined by $\|A\|_F = Tr(A^H A)$ where $Tr(.)$ is the trace function, in other words the value of the cost function is calculated, defined by:

$$J_{COMET}(\tilde{\theta}, \tilde{\sigma}_a, \tilde{\sigma}_b) = \|\hat{R}_{yy}(\tilde{\theta}) - R_{yy}(\tilde{\theta}, \tilde{\sigma}_a, \tilde{\sigma}_b)\|_F^2 \tag{13}$$

This value is compared with the value $J_{COMET}^{min}$ and if $J_{COMET}(\tilde{\theta}, \tilde{\sigma}_a, \tilde{\sigma}_b) > J_{COMET}^{min}$, $J_{COMET}^{min}$ is updated by $J_{COMET}^{min} = J_{COMET}(\tilde{\theta}, \tilde{\sigma}_a, \tilde{\sigma}_b)$ and corresponding values $(\tilde{\theta}, \tilde{\sigma}_a, \tilde{\sigma}_b)$ are stored in a memory.

At the step 470, it is verified if a predefined ordered set of parameters $(\tilde{\theta}, \tilde{\sigma}_a, \tilde{\sigma}_b)$ has been gone through. Otherwise, one moves to the next element of this set in 475 and returns to the step 430. This ordered set is for example the Cartesian product of basic sets $\Pi_\theta \times \Pi_{\sigma_a} \times \Pi_{\sigma_b}$ where $\Pi_\theta$ is a set of possible values of the parameters provided by an OFDM standard, and $\Pi_{\sigma_a}$, $\Pi_{\sigma_b}$ are intervals of values of power. The order relation on this set can be the lexicographic order.

At the step 480, the values of the parameters $\theta$, $\sigma_a$, $\sigma_b$ are estimated using:

$$(\hat{\theta}, \hat{\sigma}_a, \hat{\sigma}_b) = \underset{\tilde{\theta}, \tilde{\sigma}_a, \tilde{\sigma}_b}{\operatorname{argmin}} J_{COMET}(\tilde{\theta}, \tilde{\sigma}_a, \tilde{\sigma}_b) \tag{14}$$

in other words, the values of these parameters are retrieved in the aforementioned memory zone.

It is understood that the method of estimating shown in FIG. 4 makes it possible to jointly estimate the modulation parameters of the OFDM signal (represented by $\theta$) as well as the signal and noise power levels. This method consequently makes it possible not only to determine $NT_c$, $DT_c$ and N but also for example the signal-to-noise ratio $\sigma_a^2/\sigma_b^2$.

It is clear for those skilled in the art that if certain modulation parameters are already known to the receiver, the known values of these parameters replace their tested values $(\tilde{\theta}, \tilde{\sigma}_a, \tilde{\sigma}_b)$ in the calculation of the expressions (12) and (13). In this case, the corresponding dimension of the Cartesian product is not followed in 475.

Figure 5:
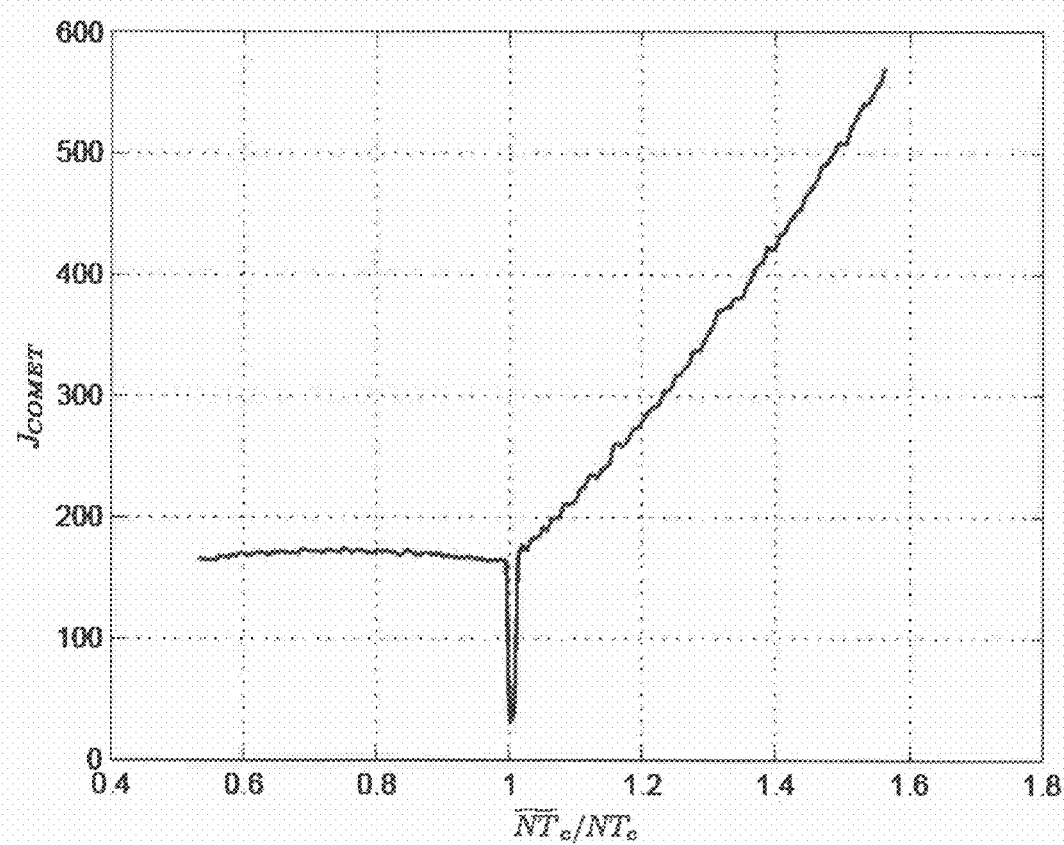
FIG. 5 shows a first example of a cost function used in the method of FIG. 4.

An example of the cost function $J_{COMET}$ is shown in FIG. 5 according to the reduced variable $$\frac{\tilde{N}T_c}{NT_c}$$

in the case where only the parameter $\tilde{N}\tilde{T}_c$ is supposedly unknown, with the other parameters taking the known values, $\tilde{D}\tilde{T}_c = DT_c$, $\tilde{N} = N$, $\tilde{\sigma}_a = \sigma_a$; $\tilde{\sigma}_b = \sigma_b$. The signal-to-noise ratio $\sigma_a^2/\sigma_a^b$ here is equal to 10 dB. Note that the cost function $J_{COMET}$ is convex and has a pronounced minimum in $\tilde{N}\tilde{T}_c = NT_c$, which allows for a precise estimation of the useful length of the OFDM symbol. Similarly, if the useful length were known and if we were looking for example for the prefix length or the number of sub-carriers, the cost function would gain have a pronounced minimum for the corresponding actual value.

Figure 6:
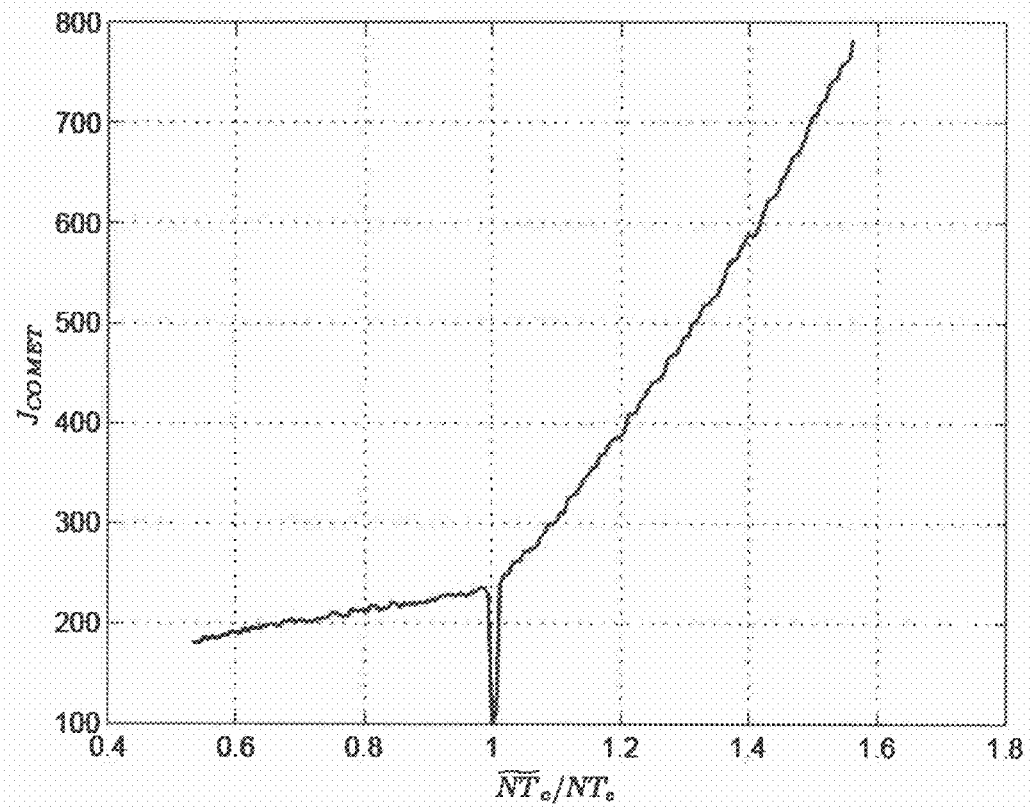
FIG. 6 shows a second example of a cost function used in the method of FIG. 4.

FIG. 6 shows another example of a cost function in the same conditions as in FIG. 5, with the exception that the signal-to-noise ratio here is equal to 0 dB, in other words $\sigma_a = \sigma_b$. Note that the cost function still has a minimum for $\tilde{NT}_c = NT_c$ but on the other hand it is no longer convex. More generally, it is observed that the cost function loses its property of convexity at low levels of signal-to-noise ratio. This absence of convexity can be harmful in the searching of the minimum of the function, for example if this research is not carried out by means of a systematic scanning but by means of a gradient descent.

In the case of a low signal-to-noise ratio, it is preferred to use a second embodiment described hereinafter.

The second embodiment implements a normalised cost function defined by:

$$J_{MCOMET}(\tilde{\theta}, \tilde{\sigma}_a, \tilde{\sigma}_b) = \frac{J_{COMET}(\tilde{\theta}, \tilde{\sigma}_a, \tilde{\sigma}_b)}{E(J_{COMET}(\tilde{\theta}, \tilde{\sigma}_a, \tilde{\sigma}_b))} \quad (15)$$

where $E(J_{COMET}(\tilde{\theta}, \tilde{\sigma}_a, \tilde{\sigma}_b))$ designates the average of the cost function. It can be shown that for the low values of the signal-to-noise ratio, i.e. for $\sigma_a \ll \sigma_b$, this average is equal to:

$$E(J_{COMET}(\tilde{\theta}, \tilde{\sigma}_a, \tilde{\sigma}_b)) = \frac{\tilde{P}^2}{\tilde{K}} \sigma_b^4 \quad (16)$$

As $\sigma_b$ is a constant, the normalised cost function can be reduced to:

$$J_{MCOMET}(\tilde{\theta}, \tilde{\sigma}_a, \tilde{\sigma}_b) = \frac{\tilde{K}}{\tilde{P}^2} J_{COMET}(\tilde{\theta}, \tilde{\sigma}_a, \tilde{\sigma}_b) \quad (17)$$

The method for estimating according to the second embodiment of the invention differs from that shown in FIG. 4 in that the cost function $J_{MCOMET}$ is used in place of $J_{COMET}$. The description of the processing steps therefore shall not be included here.

Figure 7:
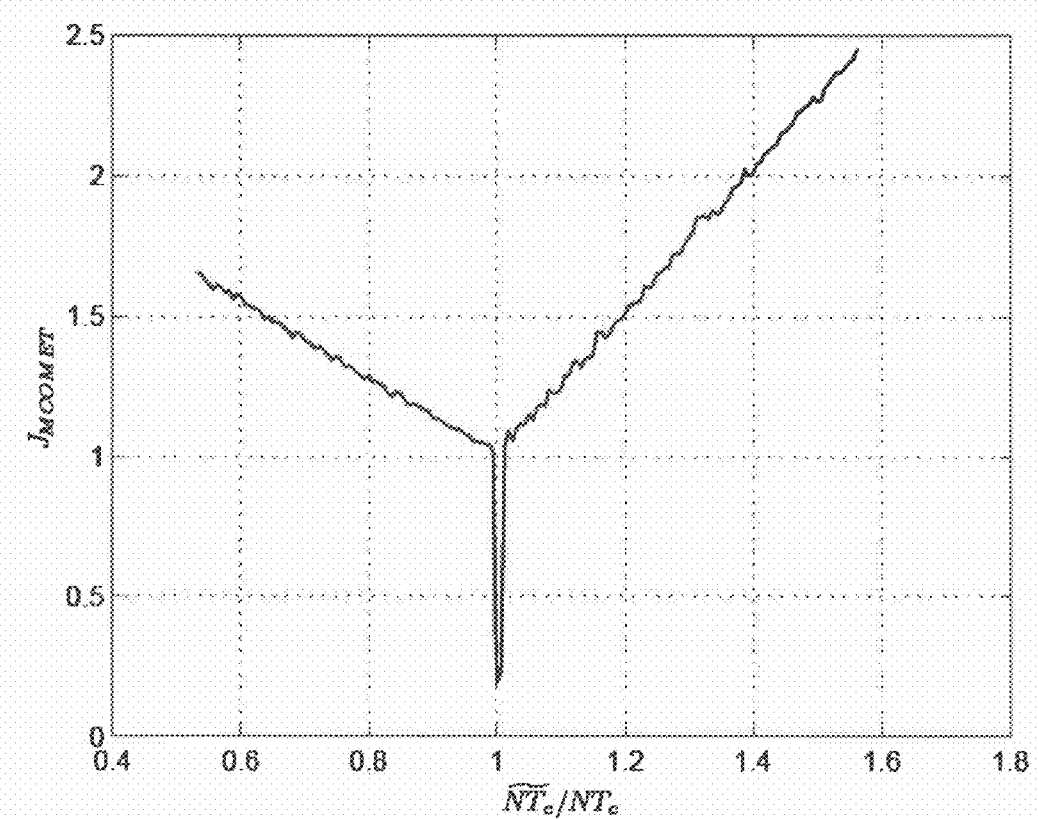
FIG. 7 shows a first example of a standardised cost function used in a second embodiment of the invention.
Figure 8:
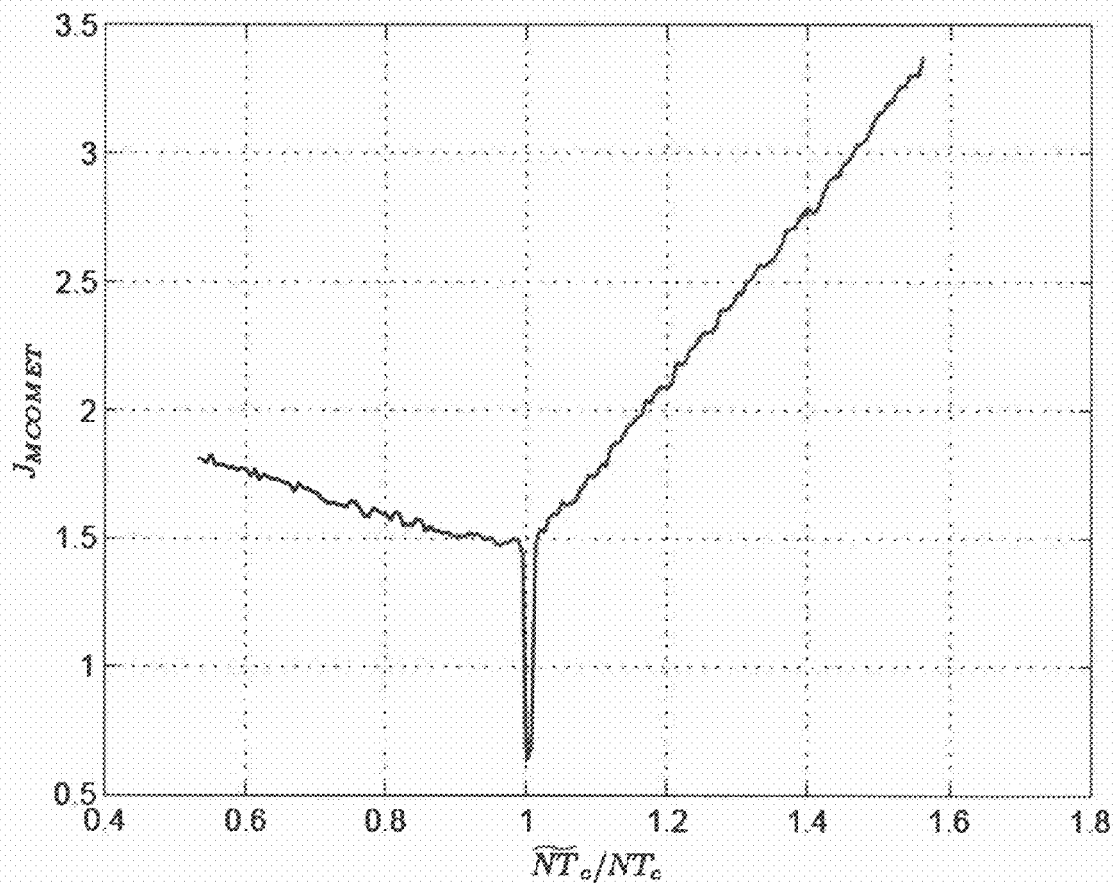
FIG. 8 shows a second example of a standardised cost function used in the second embodiment of the invention.

FIG. 7 shows a first example of a normalised cost function, in the same conditions as those in FIG. 5. Likewise, FIG. 8 shows a first example of a normalised cost function, in the same conditions as those in FIG. 6. Note that the normalised cost function is convex and has a pronounced minimum in both cases, in particular at a low level of signal-to-noise ratio, cf. FIG. 8. The method of estimating according to the second embodiment is consequently robust with respect to noise.

Figure 9:
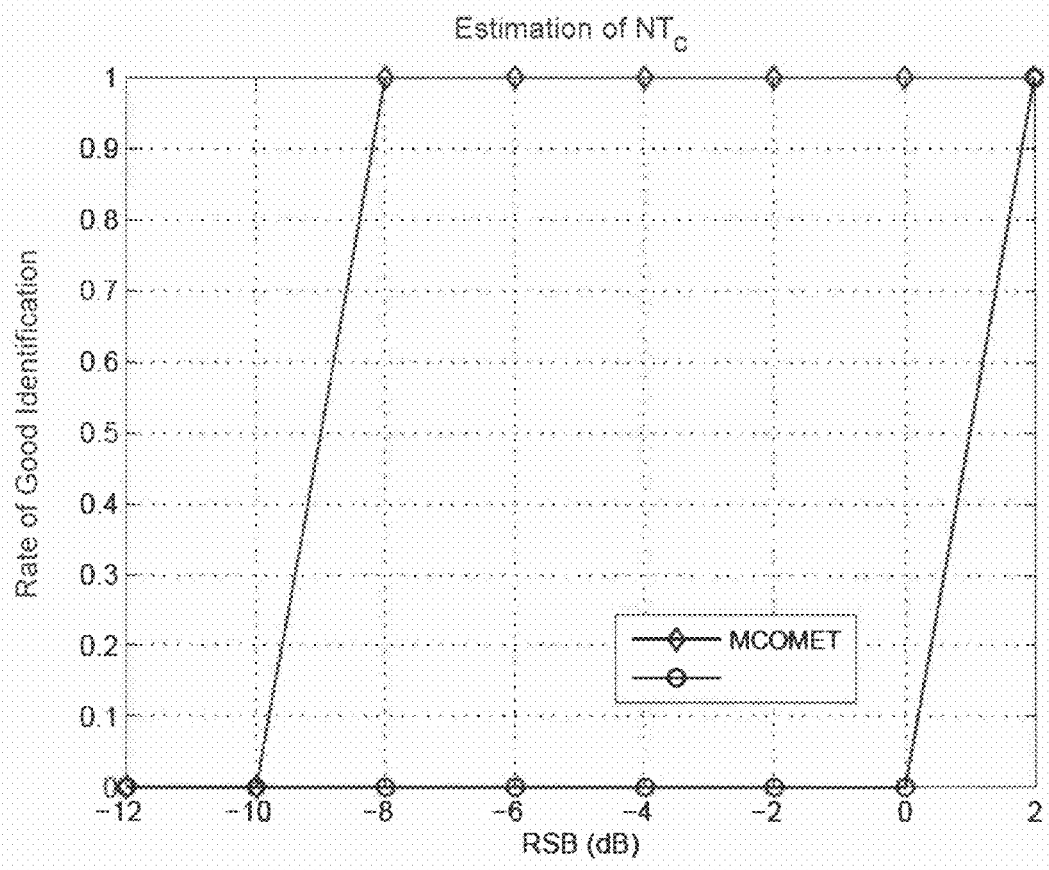
FIG. 9 gives the good estimate rate of an OFDM modulation parameter according to the signal-to-noise ratio, in the case of a joint estimation.

FIG. 9 shows the rate of good estimate (or of identification) of the parameter $NT_c$ according to the signal-to-noise ratio, in the case of a joint estimation of $NT_c$, $\sigma_a$ and $\sigma_b$. Note that the rate of good estimate is equal to 1 with the normalised cost function $J_{MCOMET}$ when the signal-to-noise ratio is greater than −8 dB. However, this rate of good estimate is achieved with the cost function $J_{COMET}$ only for a signal-to-noise ratio greater than 2 dB.

Figure 10:
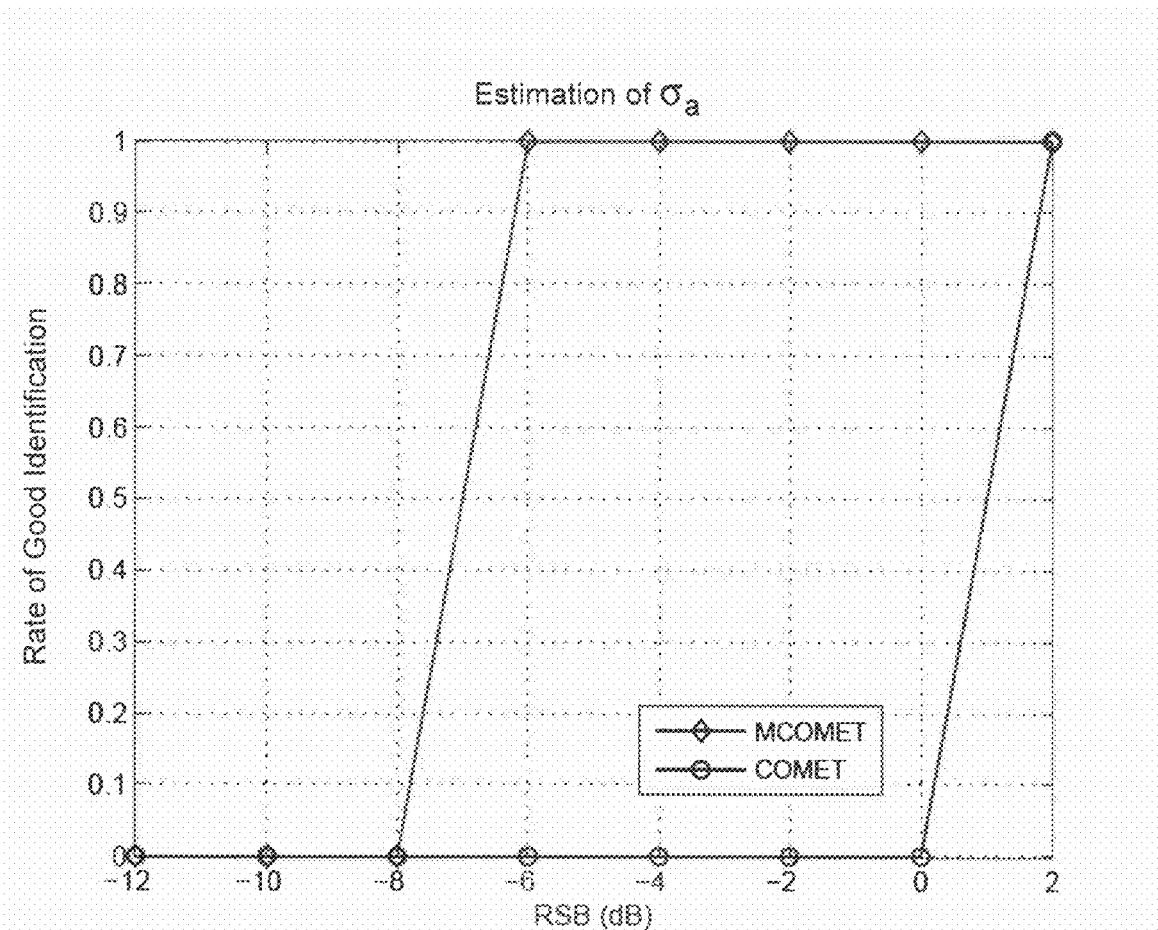
FIG. 10 gives the good estimate rate of the variance of the signal according to this same ratio, in the case of a joint estimation.

FIG. 10 shows the rate of good estimate of the variance $\sigma_a$ according to the signal-to-noise ratio, in the case of a joint estimation of $NT_c$, $\sigma_a$ and $\sigma_b$. Note here again that a rate of good estimate equal to 1 is achieved starting at −8 dB for $J_{MCOMET}$ and only starting at 2 dB for the cost function $J_{COMET}$.

Figure 11:
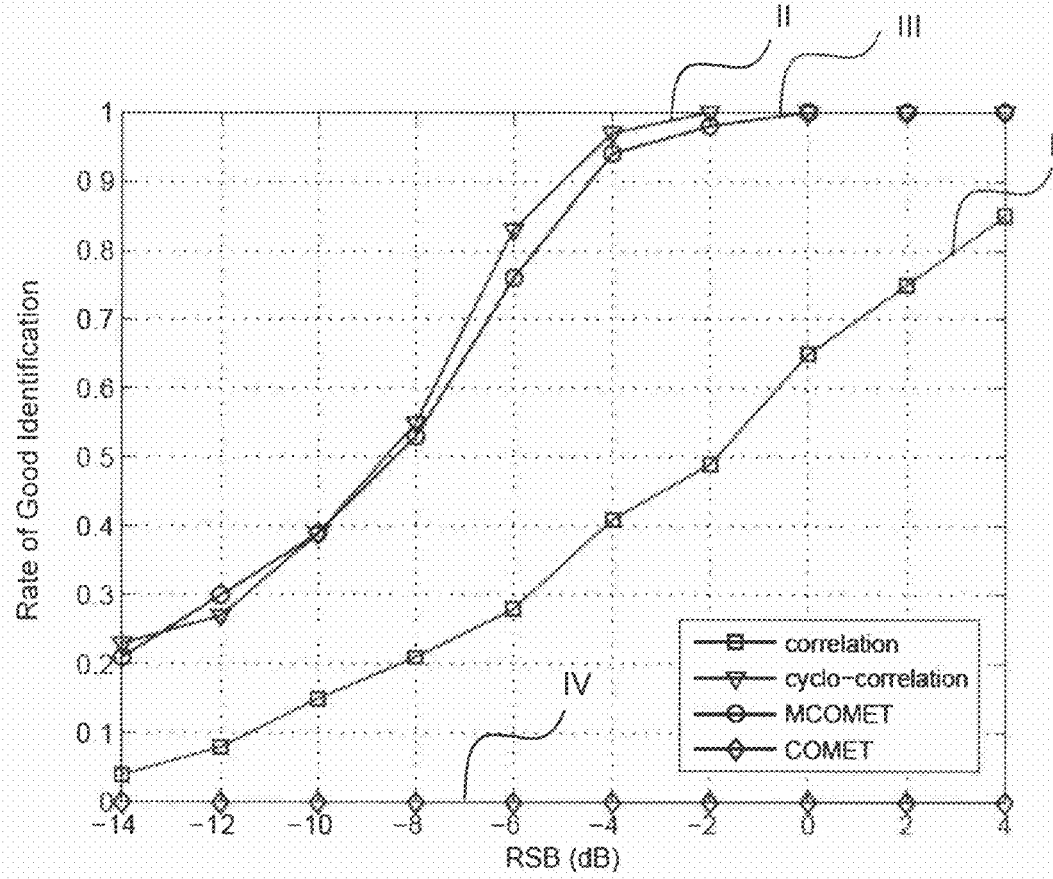
FIG. 11 compares several methods for estimating an OFDM parameter according to the signal-to-noise ratio, in the case of a perfect synchronisation of the receiver and for a short prefix duration.
Figure 12:
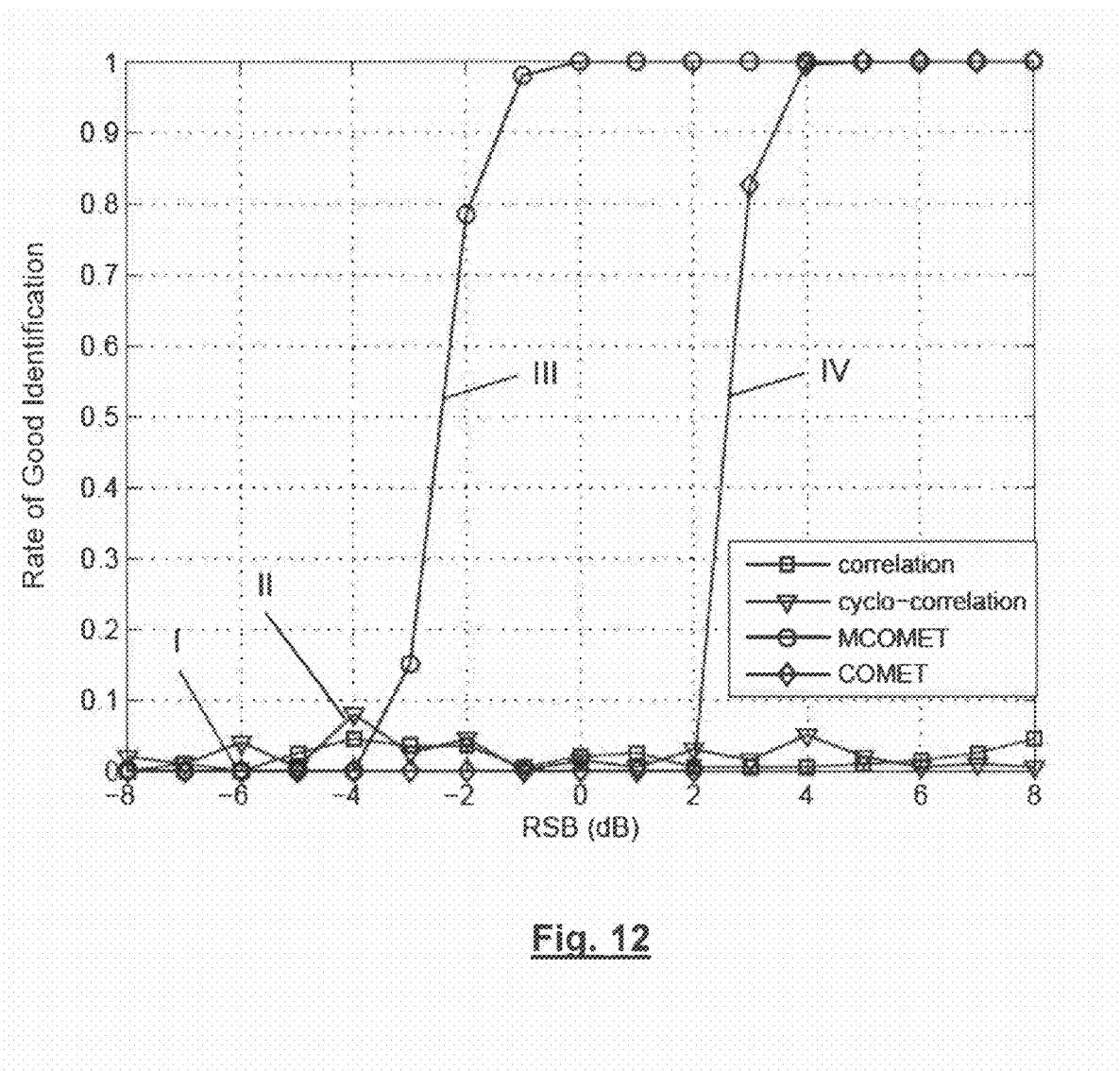
FIG. 12 compares several methods for estimating an OFDM parameter according to the signal-to-noise ratio, in the case of a perfect synchronisation of the receiver and in the absence of a prefix.
Figure 13:
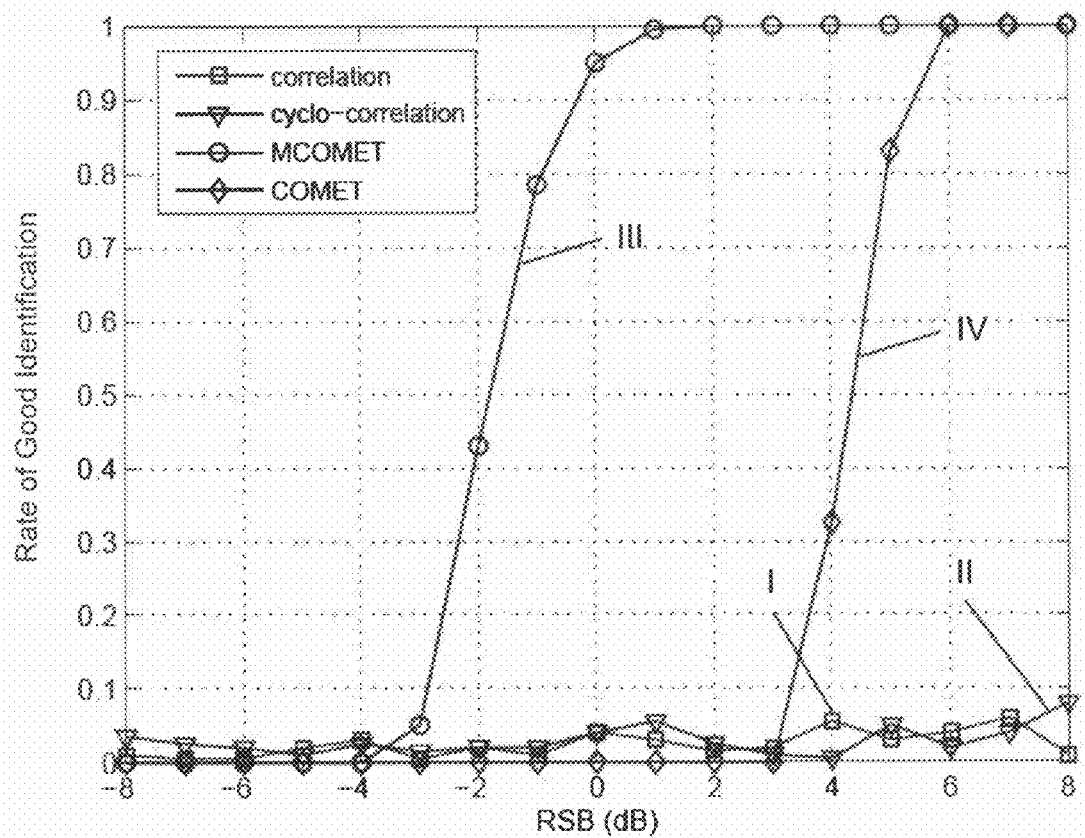
FIG. 13 compares several methods for estimating an OFDM parameter according to the signal-to-noise ratio, in the absence of synchronisation of the receiver and in the absence of a prefix.

FIGS. 11, 12 and 13 compare the performance of different methods for estimating an OFDM parameter, here the parameter $NT_c$, in terms of the rate of good estimate, according to the signal-to-noise ratio. I and II designate the curves relative to the known methods for estimation, based respectively on the correlation and the cyclic correlation of the signal received, such as described in the article of A. Bouzezgi et al. entitled "A second order statistics based algorithm for blind recognition of OFDM based systems" published in IEEE Global Telecommunications Conference, November 2008, and III and IV designate the curves relative respectively to the second and to the first embodiments of the invention.

As a basis for comparison, we have taken an OFDM signal of N=64 sub-carriers, of useful duration $NT_c$=3.2 μs and of ratio $T_c/T_e$=2. We have supposed in FIG. 11 that the duration of the prefix was equal to 1/32 th of the useful duration of the OFDM symbol (i.e. D/N=1/32). In FIGS. 12 and 13, we have supposed that the OFDM symbols were devoid of a prefix (D=0). Finally, in FIGS. 11 and 12, it was supposed that the receiver was perfectly synchronised on the OFDM signal, without time offset (start of the sampling window locked on the start of an OFDM symbol) or frequency offset (base-band demodulation frequency equal to the frequency of the carrier). On the other hand, in FIG. 13, the receiver has a random time offset and frequency offset in relation to the OFDM signal.

Note that when the duration of the prefix is short or when the prefix is absent the methods for estimating the time parameter $NT_c$ according to the invention result in rates of good estimate that are substantially higher than with the methods of prior art. This is all the more so true that the prefix is short. In the case of a total absence of prefix, conventional methods are entirely inoperative, cf. FIG. 12, while the methods according to the invention continue to give very good results, and this, even when the receiver is not synchronised, cf. FIG. 13.

The method of estimating according to the invention can be implemented in an OFDM receiver or a receiver of a secondary user in an opportunistic radio system, using dedicated circuits or software modules executed by a microprocessor, in a manner known per se.

The invention claimed is:

1. A method of estimating at least one modulation parameter of an OFDM signal, said signal being sampled during a time window in order to provide a sequence of samples, said method comprising:
   (a) grouping together consecutive samples of said sequence according to a tested value ($\tilde{\theta}$) of said parameter, in order to form a plurality of vectors;
   (b) estimating a covariance matrix ($\hat{R}_{yy}(\tilde{\theta})$) of the vectors;
   (c) calculating a theoretical covariance matrix ($R_{yy}(\tilde{\theta})$) that would be obtained using an OFDM signal of which said modulation parameter would have said tested value;
   (d) measuring a distance between the covariance matrix and the theoretical covariance matrix; and
   iterating the steps (a), (b), (c) and (d), wherein the estimated value of the parameter is that achieving a shortest distance in the step (d).

2. The method of estimating according to claim 1, wherein the theoretical covariance matrix is obtained according to said tested value of the modulation parameter, of a tested value of a power of a signal ($\tilde{\sigma}_a^2$) and of a tested value of a power of noise ($\tilde{\sigma}_b^2$), the steps (c) and (d) then being iterated for a plurality of tested values of signal and noise power.

3. The method of estimating according to claim 2, further comprising providing an estimation of a signal-to-noise ratio using power values of signal and noise minimising said distance together with the estimated value of the modulation parameter.

4. The method of estimating according to claim 2, wherein the theoretical covariance matrix is calculated by:

$$R_{yy}(\tilde{\theta},\tilde{\sigma}_a,\tilde{\sigma}_b)=\tilde{\sigma}_a^2 FF^H+\tilde{\sigma}_b^2 I$$

where $\tilde{\theta}$, $\tilde{\sigma}_a^2$, $\tilde{\sigma}_b^2$ are respectively the tested values of the modulation parameter, of the signal power and of the noise power; I is a unit matrix of size $\tilde{N}\times\tilde{N}$ where $\tilde{N}$ is a number of sub-carriers of an OFDM multiplex, known or supposed, and the matrix F is a matrix size $\tilde{P}\times\tilde{N}$ with $\tilde{P}=\lfloor(\tilde{N}\tilde{T}_c+\tilde{D}\tilde{T}_c)/\tilde{T}_e\rfloor$, of which elements are given by:

$$F_{m,\tilde{n}}^{\tilde{\theta}} = \frac{1}{\sqrt{\tilde{N}}} e^{-2i\pi n m \frac{T_c}{\tilde{N}T_c}} e^{-2i\pi n \frac{\tilde{D}T_c}{\tilde{N}T_c}}$$

where $\tilde{N}\tilde{T}_c$ is a useful duration of symbols is the OFDM signal, known or tested, $\tilde{D}\tilde{T}_c$ is a duration of a prefix of the symbols of the OFDM signal, known or tested, and $T_e$ is a sampling period of the OFDM signal.

5. The method of estimating according to claim 4, wherein the covariance matrix is estimated by:

$$\hat{R}_{yy}(\tilde{\theta}) = \frac{1}{\tilde{K}} \sum_{k=0}^{\tilde{K}-1} y_k y_k^H$$

where $y_k=(y_{k,0},\ldots y_{k,\tilde{P}-1})_T$ is a kth vector of said plurality of vectors, $y_{k,p}=(pT_e+\tilde{D}\tilde{T}_c+k(\tilde{N}\tilde{T}_c+\tilde{D}\tilde{T}_c))$ where $\tilde{N}\tilde{T}_c$ is a useful duration of symbols of the OFDM signal, known or tested, $\tilde{D}\tilde{T}_c$ is a duration of a prefix of the symbols of the OFDM signal, known or tested, $T_e$ is a sampling period of the OFDM signal and $$\tilde{K} = \frac{M}{\tilde{P}}$$

with $\tilde{P}=\lfloor(\tilde{N}\tilde{T}_c+\tilde{D}\tilde{T}_c)/\tilde{T}_e\rfloor$, and M is a total number of samples in the time window.

6. The method of estimating according to claim 5, wherein the distance between the covariance matrix and the theoretical covariance matrix is calculated by:

$$J_{COMET}(\tilde{\theta},\tilde{\sigma}_a,\tilde{\sigma}_b)=\|\hat{R}_{yy}(\tilde{\theta})-R_{yy}(\tilde{\theta},\tilde{\sigma}_a,\tilde{\sigma}_b)\|_F^2$$

where $\|.\|_F$ is a Frobenius norm.

7. The method of estimating according to claim 5, wherein the distance between the covariance matrix and the theoretical covariance matrix is calculated by:

$$J_{MCOMET}(\tilde{\theta}, \tilde{\sigma}_a, \tilde{\sigma}_b) = \frac{\tilde{K}}{\tilde{P}^2}\|\hat{R}_{yy}(\tilde{\theta}) - R_{yy}(\tilde{\theta}, \tilde{\sigma}_a, \tilde{\sigma}_b)\|_F^2$$

where $\|.\|_F$ is a Frobenius norm.

8. The method of estimating according to claim 1, wherein said modulation parameter is a total duration of an OFDM symbol.

9. The method of estimating according to claim 1, wherein said modulation parameter is a useful duration of an OFDM symbol.

10. The method of estimating according to claim 1, wherein said modulation parameter is a duration of a prefix of an OFDM symbol.

11. The method of estimating according to claim 1, wherein said modulation parameter is a number of sub-carriers of an OFDM symbol.

12. The method of estimating according to claim 1, wherein the at least one modulation parameter is a set of modulation parameters comprised of a useful duration of an OFDM symbol, of a prefix duration of an OFDM symbol and of a number of sub-carriers of an OFDM multiplex, estimated values of these parameters then being tested values jointly minimising said distance.

* * * * *